United States Patent [19]

Undlin

[11] Patent Number: 4,929,181

[45] Date of Patent: May 29, 1990

[54] TOY & INSTRUCTIONAL APPARATUS

[76] Inventor: Becky A. Undlin, 14523-C 13th Avenue North, Plymouth, Minn. 55441

[21] Appl. No.: 386,994

[22] Filed: Jul. 31, 1989

[51] Int. Cl.$^5$ ............... G09B 19/00; A63H 33/40
[52] U.S. Cl. .................................. 434/236; 446/71; 446/202; 434/433
[58] Field of Search ............ 446/202, 176, 490, 491, 446/200, 489, 475, 486, 188, 196, 180, 192, 71; 272/99; 128/725; 434/236, 433

[56] References Cited

U.S. PATENT DOCUMENTS

| | | | |
|---|---|---|---|
| 197,569 | 11/1877 | Seabury | 446/202 |
| 362,606 | 5/1887 | Chadwick | 446/202 |
| 2,544,720 | 3/1951 | Ospina-Racines | 446/202 |
| 2,762,356 | 9/1956 | Foster | 446/192 X |
| 3,298,362 | 1/1967 | Lippitt, Jr. et al. | 272/99 X |

Primary Examiner—Mickey Yu
Attorney, Agent, or Firm—John W. Adams

[57] ABSTRACT

This is a toy and instructional apparatus which includes a hollow blow tube having light weight elements normally confined therewithin and connected to each other by a light weight connecting member anchored to the tube to suspend the elements from the tube when the same are discharged therefrom by blowing into the inlet end of the tube and including a closure cap for retaining the elements within the tube when not in use. The apparatus can also be used to relieve tension or anger of the user.

12 Claims, 1 Drawing Sheet

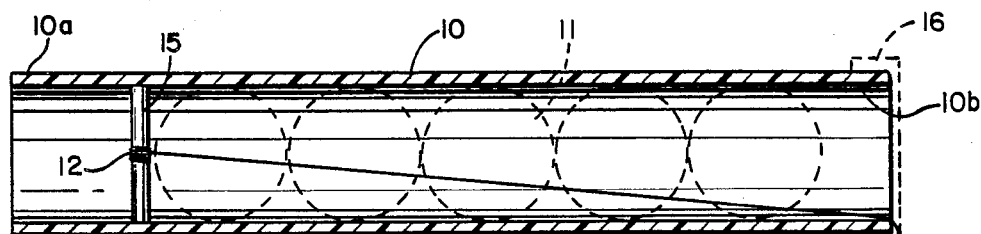
FIG. 1
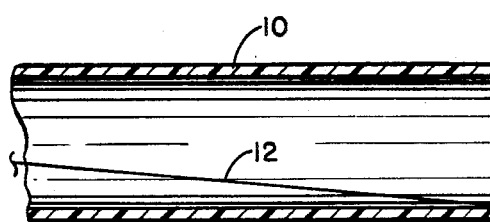
FIG. 2
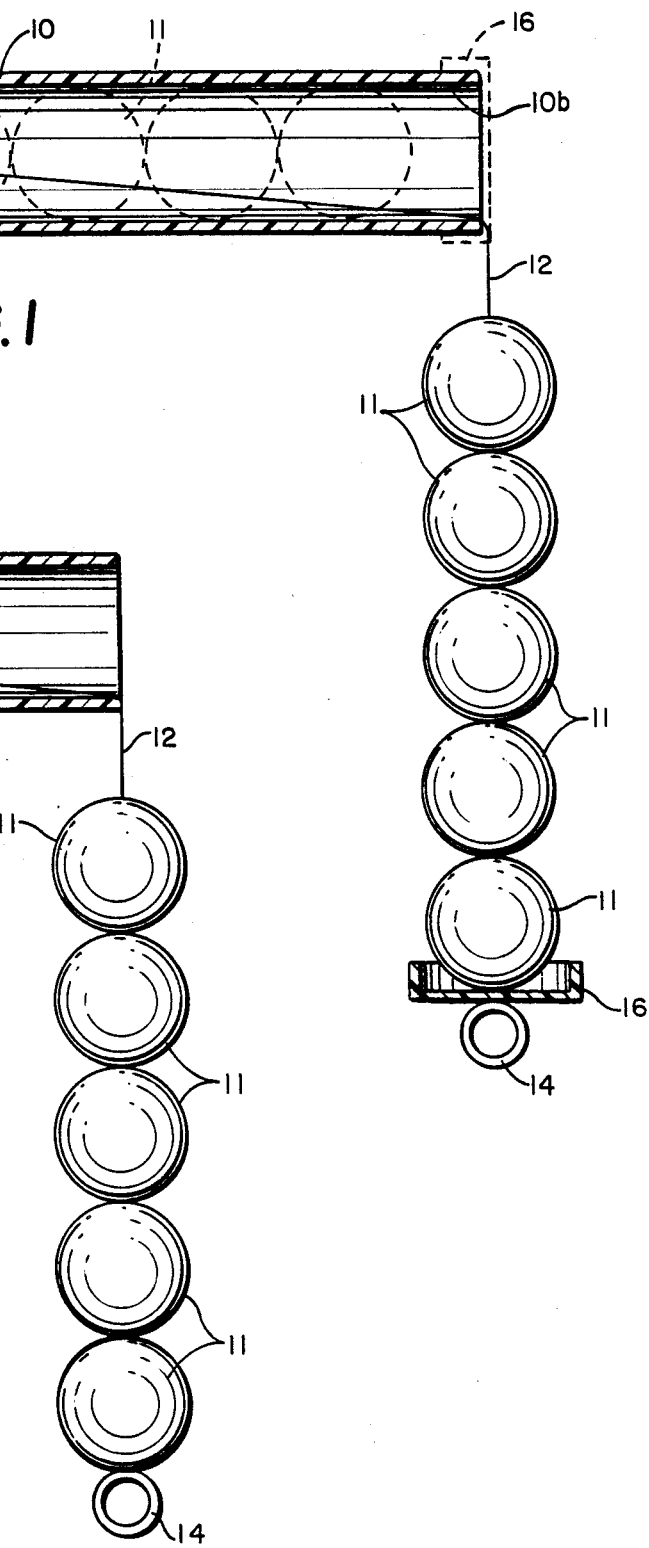

TOY & INSTRUCTIONAL APPARATUS

BACKGROUND OF THE INVENTION

In the past, various toys embodying the use of air pressure have been developed. In some instances, these toys have used the blowing capacity of a human being as the actuating power source. Such devices are disclosed in early prior art patents, U.S. Pat. No. 741,360 granted to Mosley, Oct. 19, 1903 and U.S. Pat. No. 793,177 granted to Cady, June 27, 1905. These two patents represent the Prior Art known to Applicant and Applicant's attorney at the time of filing the present application. In the Mosley patent, a hollow inflatable and collapsible figure is projected out of a receptacle and inflated by the force of a person blowing through a mouth piece into the receptacle. In the Cady patent, a float or follower member is mounted within a tube and is projected upwardly in the tube by the force of a person blowing into a mouth piece connected to the bottom of the tube. The force is measured by the distance the follower is moved within the tube. Neither of the two prior art patents is particularly pertinent to the present invention.

SUMMARY OF THE INVENTION

The present invention embodies a hollow tube open at both ends and having a plurality of light weight elements slidably mounted within the tube. The light weight elements are connected to each other by a flexible thread which is also anchored at one end within the tube so that when a person blows on one end of the tube, all of the light weight elements are blown out of the tube and fall serially from the exit end and are loosely connected by the flexible thread.

DETAILED DESCRIPTION OF THE DRAWINGS

FIG. 1 is a longitudinal sectional view of apparatus embodying the invention; and FIG. 2 is a similar view of a slightly modified form of the invention.

DETAILED DESCRIPTION OF THE PREFERRED EMBODIMENT

As shown in the accompanying drawings, a hollow generally cylindrical tube 10 is provided. A plurality of light weight spherical ball units 11 are mounted within the tube 10. The balls 11 are connected by a light weight thin thread member 12 which may extend serially through the balls, as shown. The balls may be hollow, as shown in FIG. 1, or they may be made from any light weight material such as plastic foam as shown in FIG. 2. The connecting thread may extend loosely through the diameter of the balls so that each ball is free to slide on the thread in the form shown. The thread 12 may also be elastic if desired. A stop member such as the ring 14 may be provided on the end of the thread to keep the balls from sliding off.

The other end of the thread 12 is positively anchored within the tube as by being connected to an anchoring post 15 which extends across the inside of the tube. The stop ring 14 may be easily removable to permit different balls to be exchanged, if desired. The balls may have a message printed on the outside thereof or otherwise decorated, if desired.

The open end of the tube may be provided with a closure cap 16 which will retain the balls in the tube during storage, as shown by dotted lines in FIG. 1. The cap 16 may be connected to the thread in order to prevent the cap from being lost, or it may be completely removable from the apparatus and used only for storage.

In operation, the balls are all stored within the tube, and the cap 16 may be removed from the end thereof. The person using the toy will then blow on the inlet end 10a of the tube to blow the connected light weight balls 11 out the discharge end 10b of the tube. If the thread is made from elastic material, the balls will bounce up and down after being ejected from the discharge end of tube 10. The balls may be quickly and easily returned to the tube by holding the ring 14 to apply tension to the thread and tipping the inlet end of the tube down. The cap element 16 may have the connecting thread 12 extended therethrough and be positioned between the last ball 11 and the ring 14, as illustrated in FIG. 1.

The toy apparatus may be used as an instructional aide in addition to merely providing amusement as a toy. For example, in the teaching of young children, it is important for each child to learn that certain conduct is inappropriate, such as losing your temper and abusing others. The specific act of blowing the balls out of the tube produces the natural effect of "letting off steam". The instructor would have a child who was being abusive to another child to use the apparatus to immediately stop his abusive conduct and blow into the tube to "let off steam".

What is claimed is:

1. Toy and instructional apparatus comprising a hollow elongated member having open inlet and discharge ends,
   a plurality of light weight elements inserted into the hollow member, and arranged in successive orientation within the hollow member,
   flexible means connecting the elements, and
   means connecting the flexible means to the hollow member but permitting the connected elements to be discharged from the discharge end of the member by blowing into the inlet end of the member.

2. The structure set forth in claim 1 wherein said elongated hollow member is cylindrical in shape.

3. The structure set forth in claim 2 wherein the light weight elements are spherical balls.

4. The structure set forth in claim 1 wherein the light weight elements are hollow balls with the flexible connecting means extending serially therethrough.

5. The structure set forth in claim 1 wherein the light weight elements are made of light weight solid material.

6. The structure set forth in claim 5 wherein the light weight solid material constitutes a plastic/foam.

7. The structure set forth in claim 4 wherein the hollow balls are slidably mounted on the flexible connecting means,
   and stop means for preventing the balls from sliding off the flexible connecting means.

8. The structure set forth in claim 7 wherein said stop means is releasable to permit the balls to be interchanged and replaced.

9. The structure set, forth in claim 1 and means for preventing the light weight elements from being removed from the inlet end of the hollow member.

10. The structure set forth in claim 1 and removable closure means for maintaining the light weight elements within the hollow member when not in use.

11. The structure set forth in claim 1 and means for preventing the light weight elements from being discharged from the inlet end of the hollow member.

12. The structure set forth in claim 1 wherein said flexible connecting means is made from stretchable elastic material.

* * * * *